United States Patent [19]

Ducret

[11] Patent Number: 4,769,909
[45] Date of Patent: Sep. 13, 1988

[54] QUICK CLAMPING DEVICE TO HOLD ARMORED CABLES FOR CUTTING

[76] Inventor: Lucien C. Ducret, 9 Tod's Driftway, Old Greenwich, Conn. 06870

[21] Appl. No.: 58,896

[22] Filed: Jun. 5, 1987

[51] Int. Cl.[4] .............................................. B21F 13/00
[52] U.S. Cl. ....................................... 30/90.3; 30/91.1; 30/91.2; 83/456; 83/459; 83/460
[58] Field of Search ................ 30/90.2, 90.3, 90.4, 30/91.2, 91.1; 83/456, 452, 453, 454, 459, 460; 81/389, 390, 399, 402, 9.4

[56] References Cited

U.S. PATENT DOCUMENTS

| | | | |
|---|---|---|---|
| 1,110,930 | 9/1914 | Harrison | 83/468 |
| 2,396,442 | 3/1946 | Shaver et al. | 81/9.51 X |
| 2,654,941 | 10/1953 | Schleimer | 30/90.3 |
| 2,674,027 | 4/1954 | Kosinski | 30/90.3 |
| 3,057,240 | 10/1962 | DeWitt | 83/453 X |
| 3,453,917 | 7/1969 | Perry | 83/924 X |
| 3,568,314 | 3/1971 | Adams | 30/90.4 X |
| 3,633,275 | 1/1972 | Hutchinson | 30/90.3 |
| 3,851,387 | 12/1974 | Ducret | 30/90.3 |
| 4,142,290 | 3/1979 | Ducret | 30/90.3 |
| 4,359,819 | 11/1982 | Ducret | 30/90.3 |
| 4,380,256 | 4/1983 | Peterpaul | 30/90.8 X |

FOREIGN PATENT DOCUMENTS

| | | | |
|---|---|---|---|
| 35419 | 12/1925 | Denmark | 30/296 R |
| 1261360 | 4/1961 | France | 30/90.9 |
| 555009 | 7/1943 | United Kingdom | 30/91.2 |

*Primary Examiner*—E. R. Kazenske
*Assistant Examiner*—Eugenia A. Jones
*Attorney, Agent, or Firm*—DeLio & Associates

[57] ABSTRACT

An improved quick clamping device to hold armored cables such as BX cable for cutting. The device includes a handle for receiving the cable which is preferably U-shaped and which defines a cable receiving channel. A clamping handle is hingedly attached to one end of the cable receiving handle. A clamping stud with a two-sided stop adjustable along its length is slidably held between the clamping and receiving handles such that when the handles are compressed the clamping stud projects into the cable receiving channel and clamps the cable. A spring biasing means on one side of the stop serves to hold the handles in the open, unclamped position prior to use. A resilient means such as a bowed spring steel washer is provided on the other side of the stop which compresses as required to prevent excess clamping forces from being generated which might damage the clamp. A saw is preferably mounted on a pivoted saw handle to cut the cable which it is clamped.

9 Claims, 2 Drawing Sheets

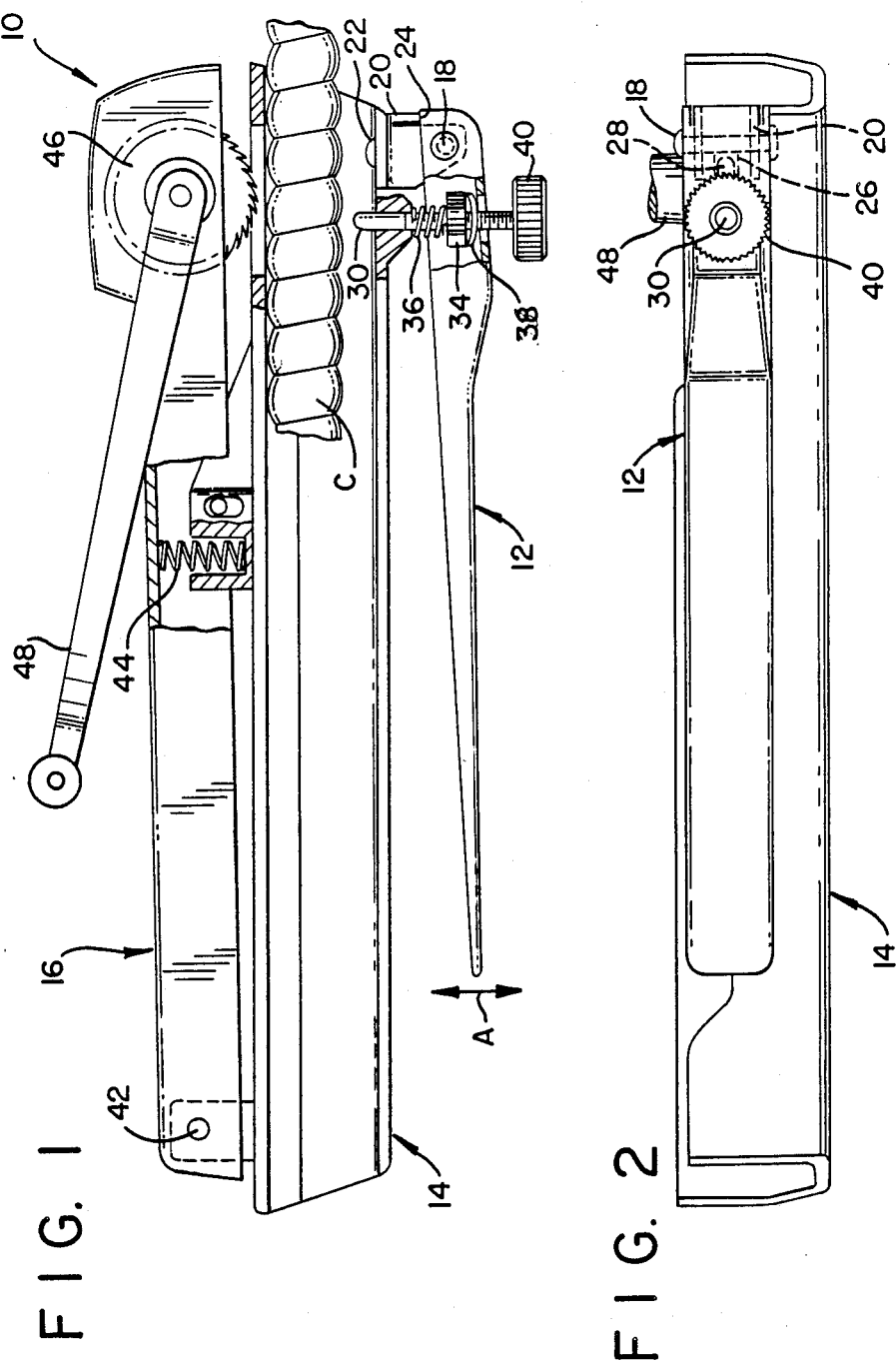

QUICK CLAMPING DEVICE TO HOLD ARMORED CABLES FOR CUTTING

BACKGROUND OF THE INVENTION

This invention relates to a quick clamping hand tool for temporarily clamping armored cable or shielded conduit such as BX cable and the like. It relates specifically to an improvement in the means for clamping the cable and adjusting the clamping mechanism to accommodate different sizes of cable. The quick clamping tool is particularly suited for temporarily clamping the cable in the proper position to have its armor cut longitudinally by a circular saw as in the Applicant's U.S. Pat. No. 3,851,387, issued Dec. 3, 1974 and U.S. Pat. No. 4,359,819, issued Nov. 23, 1982, the disclosures of which are incorporated herein by reference.

The device disclosed in U.S. Pat. No. 3,851,387 and the improvement thereon shown in U.S. Pat. No. 4,359,819 have been extremely successful in replacing the use of hacksaws in the cutting of shielded conduits so that the shielding can be cut without the blade touching the conduit or cable materials below the shielding. This is particularly important when it is desired to cut shielded electrical conduit such as BX cable, since the shielding is metallic or of other tough material which is difficult to cut without slipping with the resultant possibility of injury to an operator and the material below the shielding. it is important therefore to be able to maintain the cutter head in a rigid and fixed relationship to the shielding while at the same time guarding against injury to the operator or to the conduit. While the patented tools are adaptable to different gauge conduits, the present invention provides a simpler construction with an improved mechanism for providing adjustment for different size conduits and also incorporates features to prevent overstressing of the clamping mechanism during use.

SUMMARY OF THE INVENTION

The invention comprises a cable receiving handle defining a channel for receiving the conduit and a clamping handle hingedly connected to one end of the cable receiving handle. The cable is clamped by means of a stud which is slidably held between the cable receiving and cable clamping handles. One end of the stud projects into the cable receiving channel when the handles are squeezed, which presses the clamping stud into the cable thereby securely holding the cable in position for cutting.

A two-sided adjustable stop, such as a nut applied to a threaded portion of the stud, is positionable along the length of the stud. A return bias means, such as a spring, is located on one side of the stop to return the handles to the unclamped position when they are released. A resilient means such as a spring washer is located on the other side of the stop and serves to prevent overstressing of the handles when they are tightly gripped during the cutting operation. The clamping handle is preferably U-shaped with an internal dimension which matches the outside diameter of the two-sided stop and the resilient means, permitting them to be located within the clamping handle. The clamping stud is preferably threaded along a portion of its length and projects through the clamping handle where it is fitted with an adjusting knob permitting rotation of the clamping stud. By rotating the clamping stud, the nut (which is prevented from rotation due to its position within the clamping handle) moves along the length of the clamping stud and thereby permits adjustment of the length of the portion of the clamping stud which projects into the receiving handle to accommodate various cable dimensions.

A saw handle is preferably hingedly connected to one end of the cable receiving handle. A circular saw is mounted on the saw handle such that its cutting plane is parallel to the longitudinal axis of the saw handle. The three handles can be simultaneously grasped with one hand thereby clamping the cable and moving the saw into the cutting position. The other hand is then free to rotate the saw crank handle.

BRIEF DESCRIPTION OF THE DRAWINGS

FIG. 1 represents a side elevation of the tool with a small length of cable shown in the cutting zone, parts being broken away;

FIG. 2 represents a bottom plan view of the tool, the crank being omitted;

DETAILED DESCRIPTION OF THE PREFERRED EMBODIMENT

Figure 3:
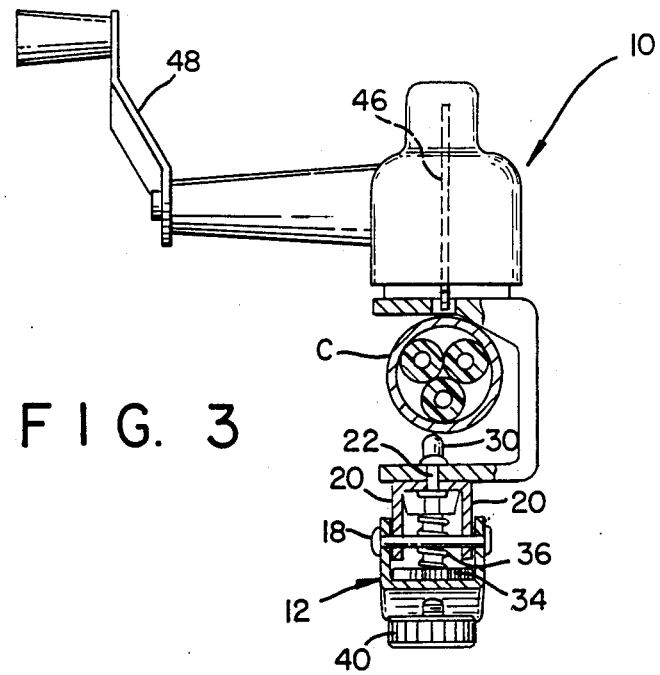
FIG. 3 represents an end elevation of the tool from the right of FIG. 1, parts of the cutter head being broken away and in section.

Referring to FIG. 1, the tool is indicated generally at 10. The principal parts of the tool comprise the cable clamping handle 12, the cable receiving handle 14, and the saw handle 16. The cable clamping handle 12 is hingedly connected to one end of the cable receiving handle 14 by means of pivot pin 18. The cable receiving handle 14 is preferably U-shaped in cross section. The U-shape opens to the side and defines a channel for receiving the cable "C" as is more clearly seen in FIG. 3.

The cable clamping handle 12 is also preferably U-shaped at the pivot end with an internal dimension which is just slightly larger than the external dimension of pivot block 20. Pivot block 20 is fastened by means of rivet 22 to one end of the cable receiving handle 14.

The U-shaped portion of cable clamping handle 12 fits over the pivot block 20 and pivot pin 18 passes through each, providing a hinge connection between the cable clamping handle 12 and the cable receiving handle 14.

The pivoting action around pivot pin 18 allows a limited up and down motion of the clamping handle 12 as indicated by the arrow "A". The motion of the clamping handle 12 is limited in one direction by the cable receiving handle 14 and in the opposite direction by contact between the end of the cable clamping handle 12 and stop 24 which is formed as part of the pivot block 20. As can be seen more clearly in FIG. 4, pivot block 20 is prevented from undesirable rotation around the rivet 22 by means of notch 26 in the pivot block 20 which engages rib 28. Rib 28 is formed as an integral part of the cable receiving handle 14.

Cable clamping stud 30 freely slides within a journal 32 formed within the lower wall of the cable receiving handle 14.

A two-sided stop 34 can be adjustably moved along the length of clamping stud 30. In the preferred embodiment, clamping stud 30 is threaded along a portion of its length, and the two-sided stop 34 comprises a standard nut. By rotating the clamping stud, the nut 34 moves along the length of clamping stud 30. The position of the stop 34 determines the length of clamping stud 30 which projects into the cable receiving channel in handle 14 when the handles are squeezed. This permits adjustment of the clamp to accommodate different cable dimensions.

A biasing means 36, such as a spring, presses outward between one side of the stop 34 and the periphery of the journal 32 and serves to bias the clamping handle to the unclamped position. On the other side of adjustable stop 34, is located a resilient means 38 whose function is described in detail below.

The threaded end of the clamping stud 30 projects through an opening in the clamping handle 12 and is provided with an adjusting knob 40 which is securely fastened to the clamping stud 30 by means of an adhesive, set screw, lock nut or any other suitable means. Rotation of knob 40 rotates the stud 30 causing the nut 34 to move along the threaded portion of the stud 30. The external dimension of nut 34 matches the internal dimension of the U-shaped portion of handle 12, thus preventing rotation of the nut 34 when knob 40 is turned.

In use, the clamping mechanism functions in the following manner. The spring 36 presses between one side of the adjustable stop 34 and the cable receiving handle 14 so as to bias the clamping handle to the unclamped position. In the unclamped position the clamping stud 30 is retracted sufficiently to permit the cable "C" to be inserted or removed from the cable receiving handle 14. A cable to be cut is inserted into the cable receiving handle 14 and adjusting knob 40 is rotated to bring the clamping stud 30 into position near the cable "C". When the handles 12, 14 are gripped, the clamping handle 12 moves upwardly toward the cable receiving handle 14. As it moves, it presses up on the resilient means 38 (seen most clearly in the detail view in FIG. 4) which presses on the adjustable stop 34 which then forces the clamping stud 30 into clamping contact with the armor around cable "C".

Resilient means 38 is preferably a bowed spring steel washer which flattens slightly as the clamping pressure is applied and returns to shape upon the release of that pressure. The resiliency of member 38 prevents overstressing of the mechanical components which may occur when excess pressures are applied during the cutting operation. Thus, member 38 serves to lengthen the lifetime performance of the tool and prevent premature breakage.

Upon release of the clamping pressure, biasing means 36 returns the clamping handle 12 to the unclamped position, ready for removal of the cable.

Although resilient means 38 is preferably a square or rectangular bowed spring steel washer, it may alternatively be formed from any resilient material such as rubber or other elastomeric material. However it should require a significantly greater force to compress the resilient means than to deflect the biasing means 36 which serves only to return the handles to the unclamped position. It is preferable that the resiliency of member 38 be selected such that the desired clamping force to be exerted by the clamping stud 30 in normal operation be sufficient to only slightly compress the resilient means 38. As a result, if the handles are squeezed excessively, or the clamping stud is set too tightly, the resilient means 38 will be compressed until the clamping handle 12 contacts the cable receiving handle 14. This acts to stop any further motion of the handles, thereby preventing excess forces from being generated. Such excess forces might damage the tool or excessively deform the cable shielding.

Figure 4:
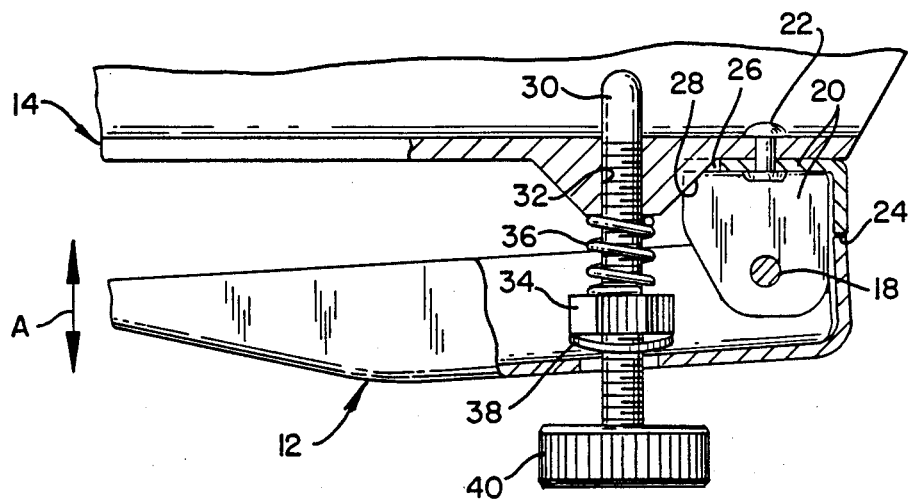
FIG. 4 represents a detail view of the clamping portion of the tool.

The tool will function effectively as a quick clamping device for cables with only the clamping handle 12, the receiving handle 14 and the clamping mechanism shown in the detail view of FIG. 4. However, it is much preferred to integrate the quick clamping mechanism with a saw as is seen in FIG. 1 so that by clamping the cable, the cable is securely held relative to the saw. Thus, the armor can be cut without risk of injury to the operator or the insulated cable inside the armor.

In the preferred embodiment the saw handle 16 pivots on pivot pin 42. A spring 44 is provided to bias the saw handle to the non-cutting position away from the cable receiving handle 14. A circular saw 46 turned by crank handle 48 is mounted on the saw handle 16 with the cutting plane of the saw parallel to the longitudinal axis of the saw handle.

The three handles 12, 14, 16 are mounted such that they can be gripped in one hand. The clamping handle and saw handle will automatically move to the clamping and cutting positions respectively as the tool is grasped with one hand. The other hand can then be used to turn the saw crank 48 and cut the armor. Although a hand operated saw is shown, an electrically powered saw may also be used.

I claim:

1. A quick clamping tool for temporarily clamping shielded conduit comprising:
   an elongated cable receiving handle defining a cable receiving channel;
   an elongated cable clamping handle hingedly connected to the cable receiving handle member at one end thereof; and
   a cable clamping means moveable between clamped and unclamped positions by relative motion of the cable clamping and cable receiving handles, said cable clamping means comprising:
   a clamping stud slidably held between the cable receiving and cable clamping handles, one end of the stud projecting into the cable receiving channel when the handles are in the clamped position and the other end projecting through the cable clamping handle;
   a two-sided stop mounted on the stud and adjustable along the length of the stud, said adjustability controlling the distance the stud projects into the cable receiving channel when the handles are in the clamped position;
   a return bias means located on one side of the stop between the cable receiving handle and the stop to bias the handles to the unclamped position; and
   a resilient means located on the other side of the stop between the cable clamping handle and the stop.

2. A quick clamping tool according to claim 1 wherein the clamping stud is threaded along at least a portion of its length and the adjustable stop is internally threaded permitting adjustment of the position of the stop by relative rotation of the stud and the stop.

3. A quick clamping tool according to claim 2 wherein the clamping handle has a U-shaped cross section and the stop nests inside the U-shape thereby preventing rotation of the stop.

4. A quick clamping tool according to claim 3 wherein the resilient means is a bowed spring washer which nests inside the U-shape between the stop and the clamping handle.

5. A quick clamping tool according to claim 3 wherein the threaded portion of the stud projects through the clamping handle and is provided with an adjusting knob mounted on the end of the stud to facilitate rotation of the stud relative to the stop.

6. A quick clamping tool according to claim 5 wherein the stop is a nut.

7. A quick clamping tool according to claim 1 wherein the resilient means is a resilient washer around the stud.

8. A quick clamping tool according to claim 7 wherein the resilient washer is a bowed spring metallic washer.

9. A quick clamping tool according to claim 1 further including:
- an elongated saw handle hingedly connected to the cable receiving handle; and
- a circular saw carried by the saw handle in a position such that its cutting plane is parallel to the longitudinal axis of the saw handle.

* * * * *